United States Patent
Uchida

(10) Patent No.: US 6,944,385 B2
(45) Date of Patent: Sep. 13, 2005

(54) PLANAR OPTICAL WAVEGUIDE AND METHOD OF MANUFACTURING THE SAME

(75) Inventor: Tatsuro Uchida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 207 days.

(21) Appl. No.: 10/359,651

(22) Filed: Feb. 7, 2003

(65) Prior Publication Data
US 2003/0152354 A1 Aug. 14, 2003

(30) Foreign Application Priority Data

| Feb. 8, 2002 | (JP) | ............................. 2002-031941 |
| Jan. 23, 2003 | (JP) | ............................. 2003-014482 |

(51) Int. Cl.$^7$ ................................................. G02B 6/10
(52) U.S. Cl. ...................... 385/129; 385/14; 264/1.24
(58) Field of Search .......................... 385/14, 88, 129, 385/40; 264/1.24

(56) References Cited

U.S. PATENT DOCUMENTS

| 4,085,501 A | * | 4/1978 | Currie ......................... 29/593 |
| 4,887,255 A | * | 12/1989 | Handa et al. ............. 369/112.27 |
| 5,436,991 A | * | 7/1995 | Sunagawa et al. ............. 385/37 |
| 5,452,384 A | * | 9/1995 | Kurita et al. .................. 385/33 |
| 5,835,646 A | | 11/1998 | Yoshimura et al. ............ 385/14 |
| 5,987,202 A | * | 11/1999 | Gruenwald et al. ........... 385/49 |
| 6,295,403 B1 | * | 9/2001 | Takeuchi et al. ............. 385/129 |
| 6,438,281 B1 | * | 8/2002 | Tsukamoto et al. ........... 385/14 |
| 6,693,736 B1 | * | 2/2004 | Yoshimura et al. ......... 359/333 |
| 2003/0039455 A1 | * | 2/2003 | Ouchi .......................... 385/88 |
| 2003/0128907 A1 | * | 7/2003 | Kikuchi et al. ............... 385/14 |
| 2004/0081402 A1 | * | 4/2004 | Ouchi .......................... 385/40 |

FOREIGN PATENT DOCUMENTS

| JP | 8-220357 | 8/1996 |
| JP | 9-96746 | 4/1997 |
| JP | 10-206677 | 8/1998 |
| JP | 2000-199827 | 7/2000 |

* cited by examiner

Primary Examiner—Ellen E. Kim
(74) Attorney, Agent, or Firm—Fitzpatrick, Cella, Harper & Scinto

(57) ABSTRACT

A method of manufacturing a two-dimensional (planar) optical waveguide comprises a first step of preparing a member having a thermoplastic structure (102) formed on a substrate (100), a second step of deforming the structure by heat treatment and a third step of forming an optical waveguide section (112) on the structure and the substrate.

8 Claims, 10 Drawing Sheets

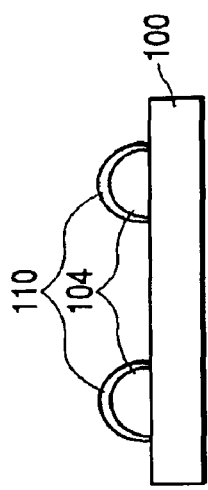
FIG. 1A
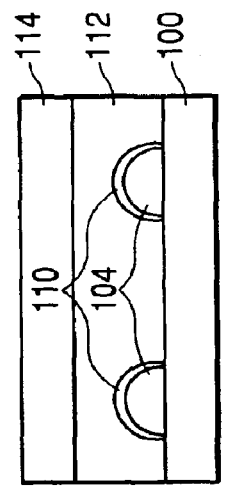
FIG. 1B
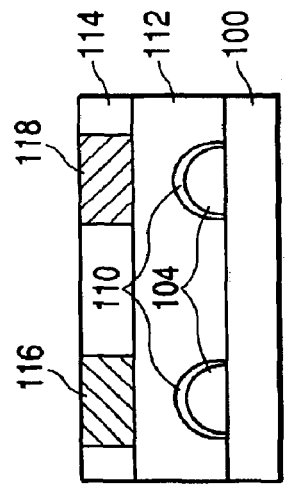
FIG. 1C
FIG. 1D
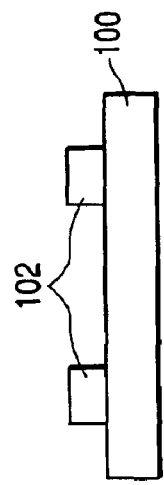
FIG. 1E
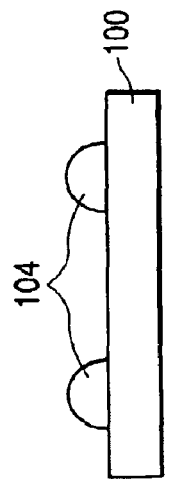
FIG. 1F
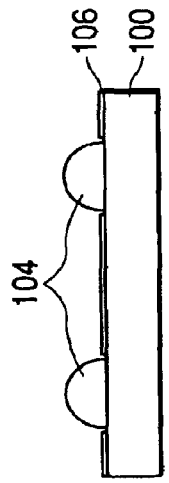
FIG. 1G
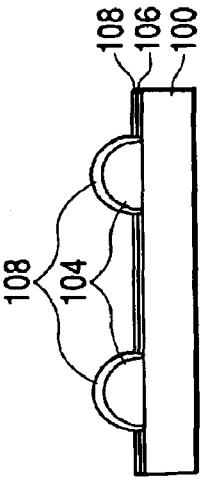

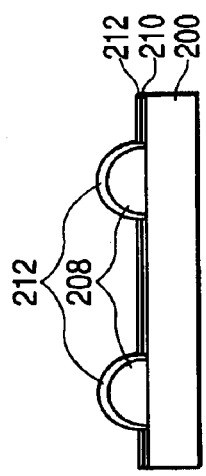
FIG. 2A
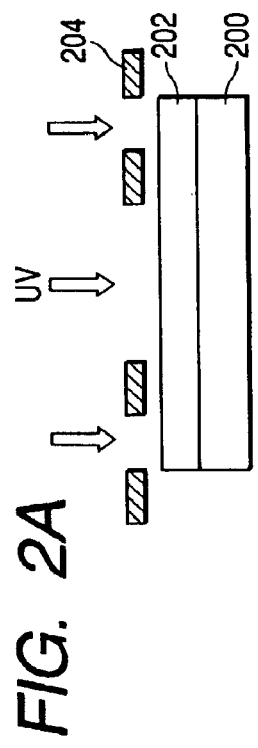
FIG. 2B
FIG. 2C
FIG. 2D
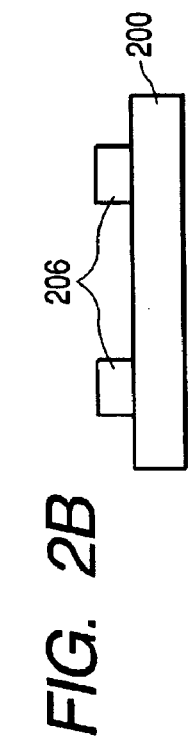
FIG. 2E
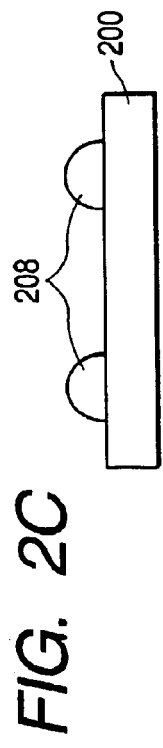
FIG. 2F
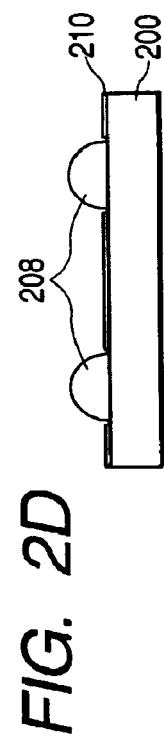
FIG. 2G
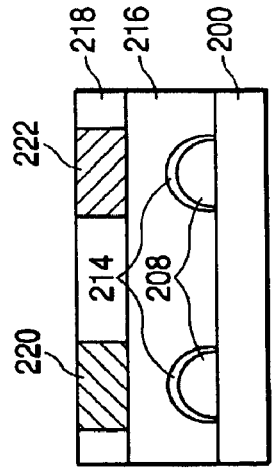
FIG. 2H

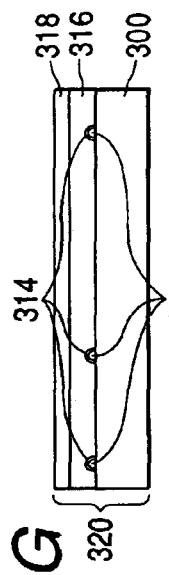
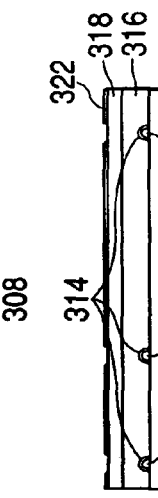
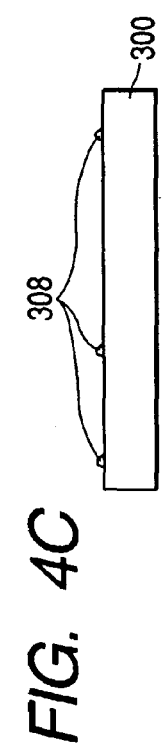
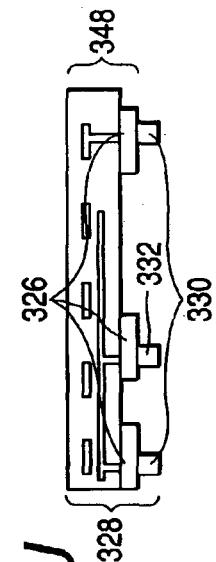
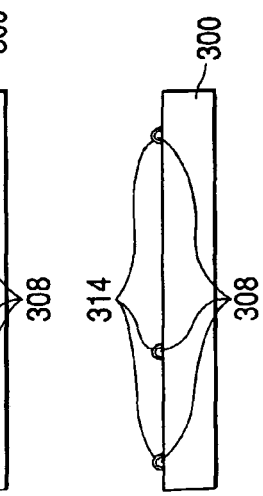
FIG. 4G  FIG. 4H  FIG. 4I  FIG. 4J  FIG. 4K
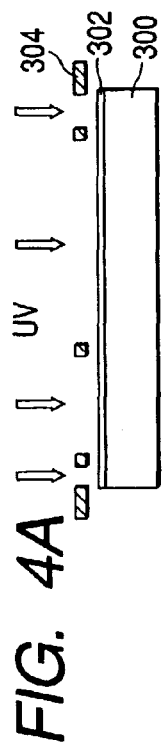
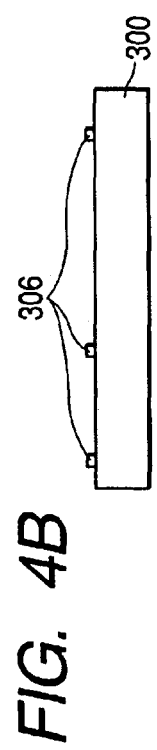
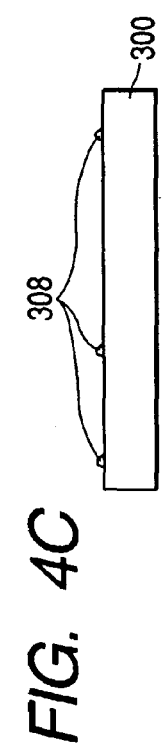
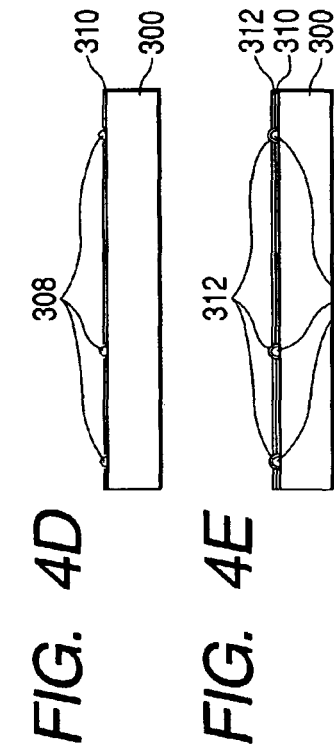
FIG. 4A  FIG. 4B  FIG. 4C  FIG. 4D  FIG. 4E  FIG. 4F

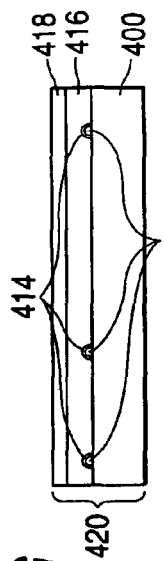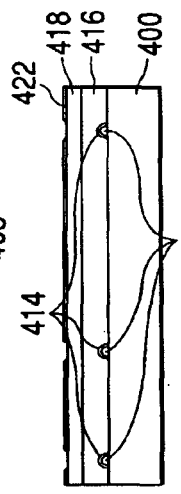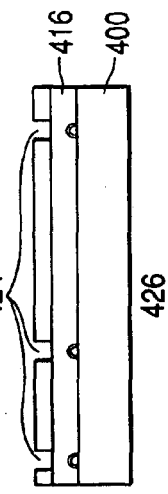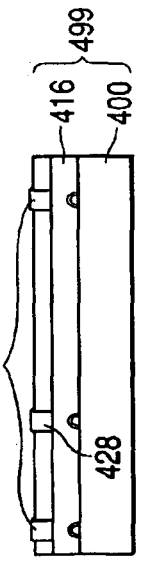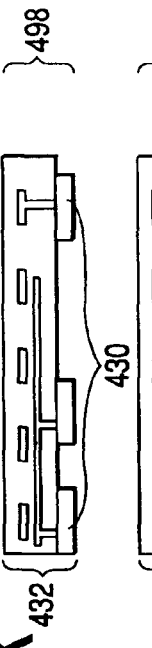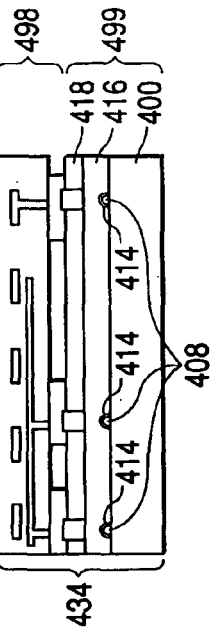
FIG. 5G  FIG. 5H  FIG. 5I  FIG. 5J  FIG. 5K  FIG. 5L
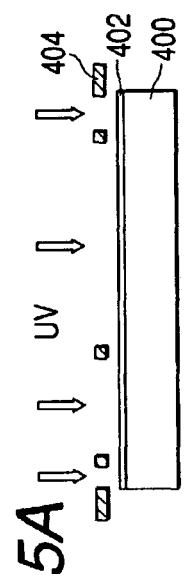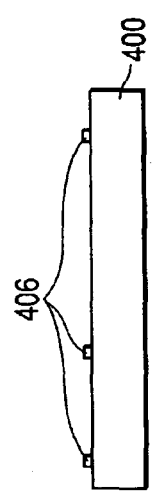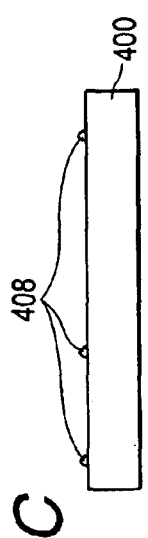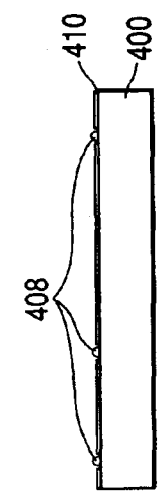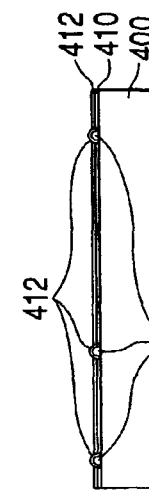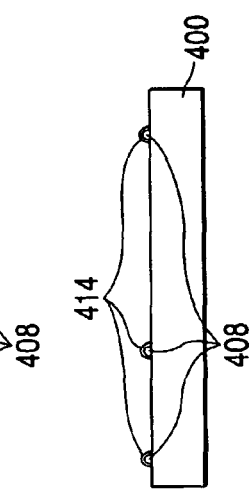
FIG. 5A  FIG. 5B  FIG. 5C  FIG. 5D  FIG. 5E  FIG. 5F

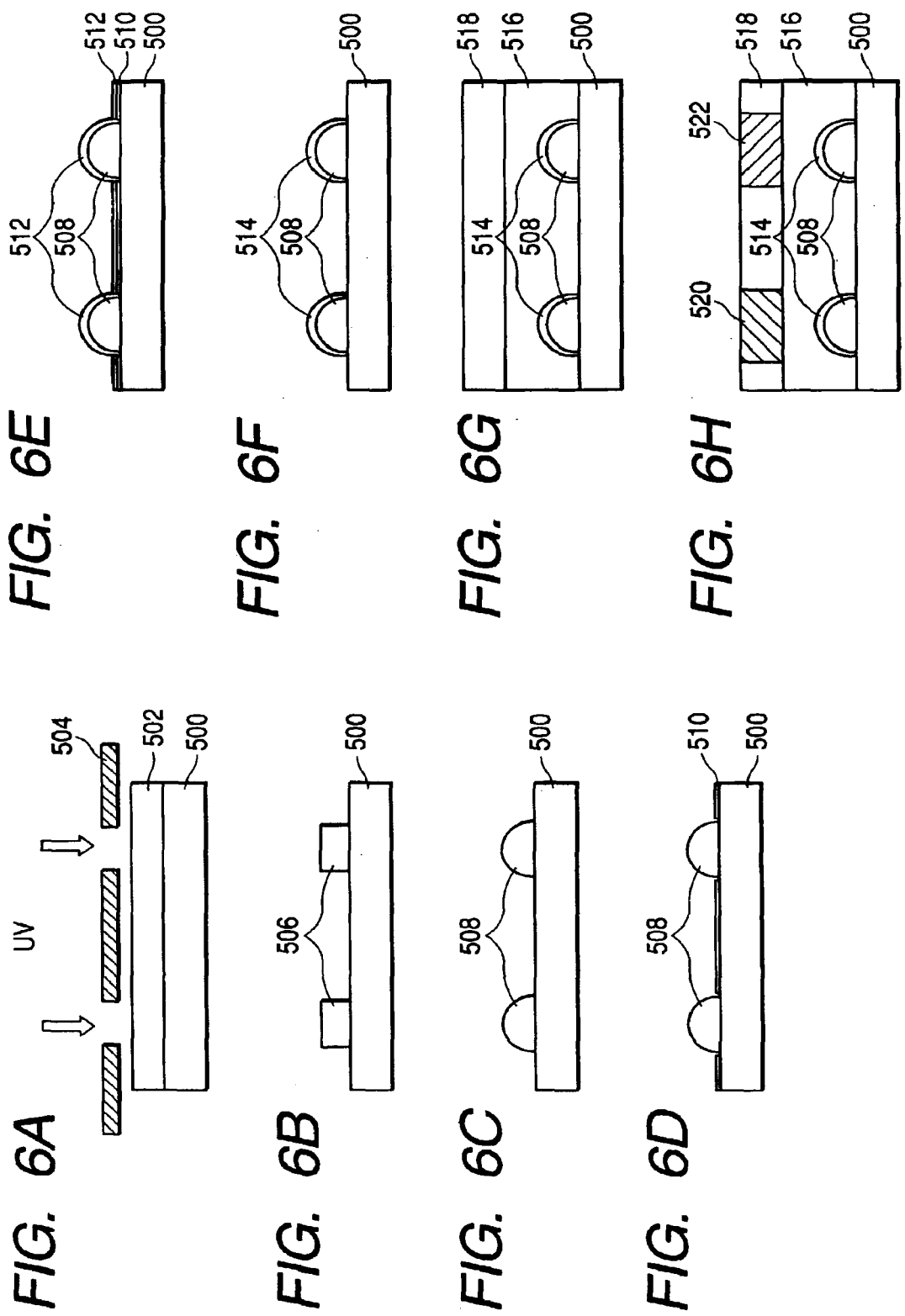

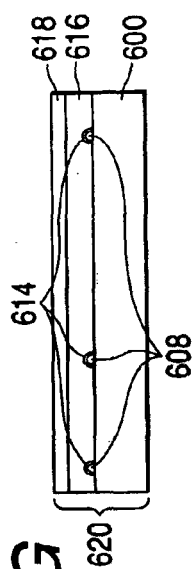
FIG. 8A
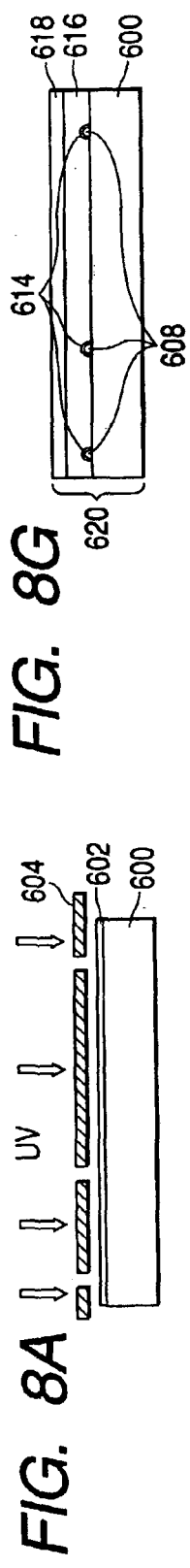
FIG. 8B
FIG. 8C
FIG. 8D
FIG. 8E
FIG. 8F
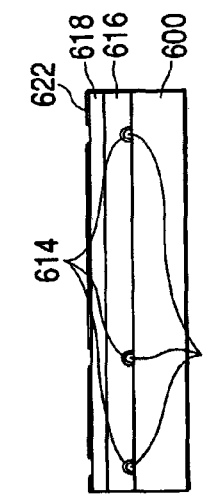
FIG. 8G
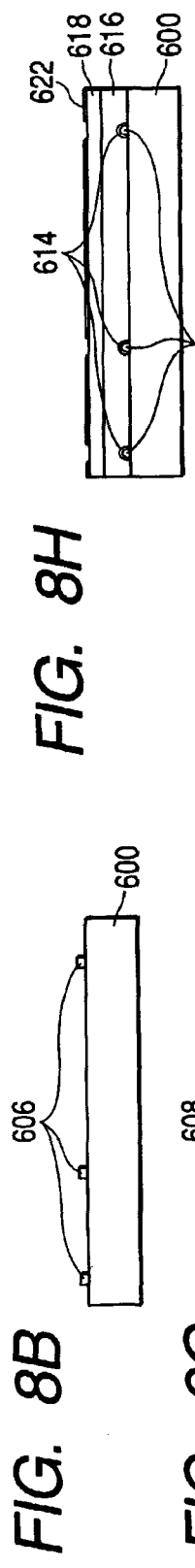
FIG. 8H
FIG. 8I
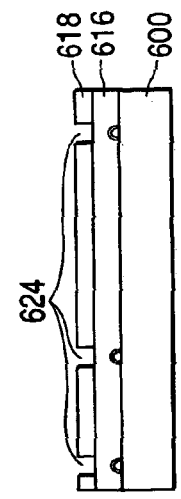
FIG. 8J
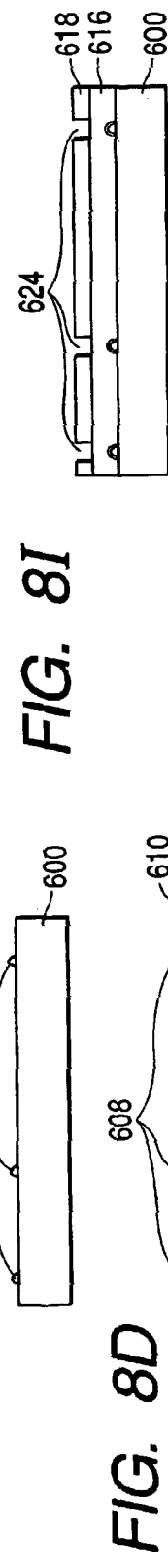
FIG. 8K

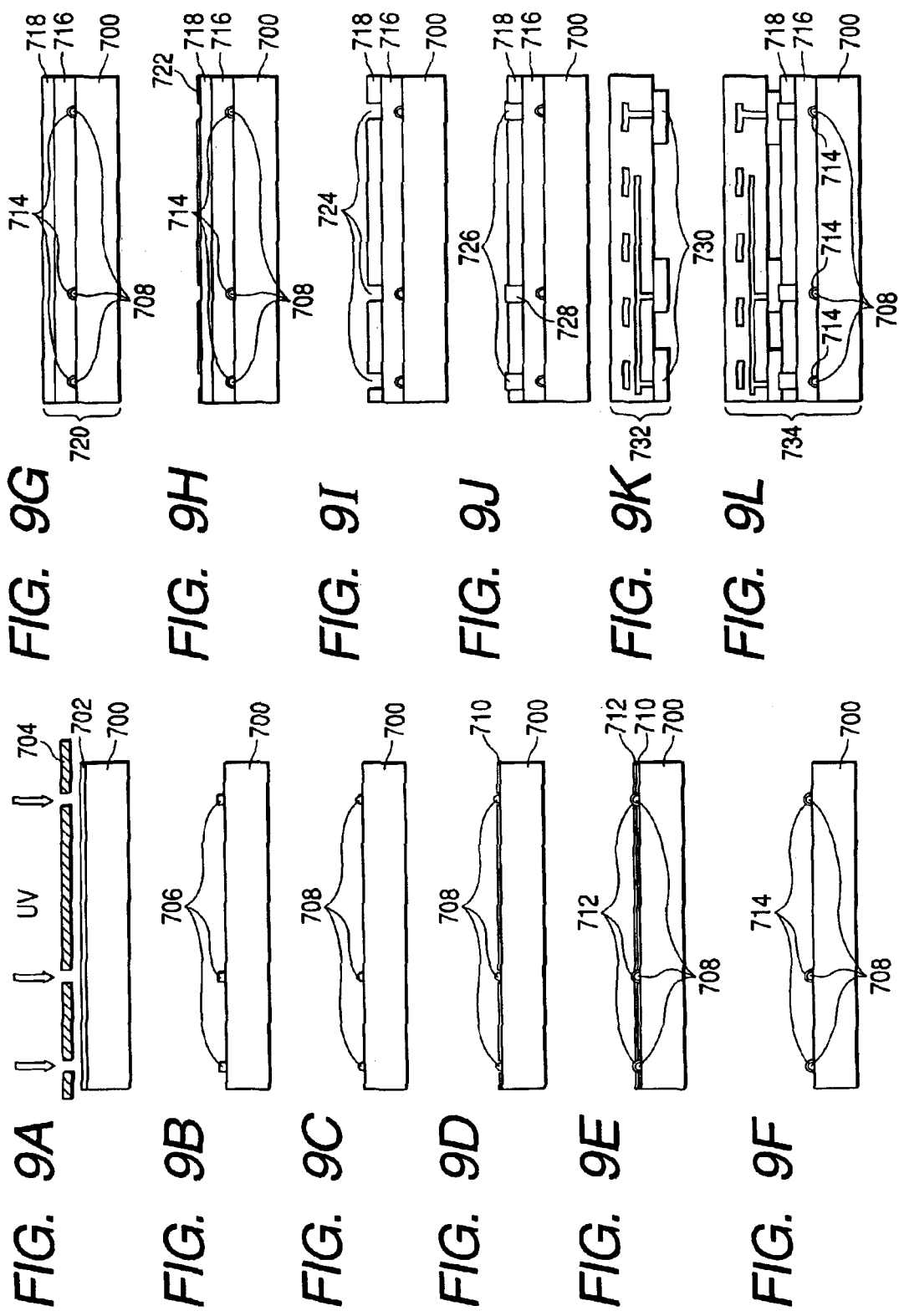

PLANAR OPTICAL WAVEGUIDE AND METHOD OF MANUFACTURING THE SAME

BACKGROUND OF THE INVENTION

1. Field of the Invention

The present invention relates to a planar (i.e., two-dimensional) optical waveguide and a method of manufacturing the same.

2. Related Background Art

The quick spread of mobile phones and personal information terminals in recent years has entailed development of down-sized, lightweight and sophisticated circuit boards that are highly integrated and adapted to operate very fast. As a result, there have arisen problems including wiring delays and EMI (electromagnetic interferences).

While conventional electric wiring suffers from such problems, optical wiring technologies have drawn attention as means for dissolving the problems because optical wiring is free from wiring delays and signal degradations and can reduce electromagnetic interferences caused by wires.

For example, Japanese Patent Application Deposited-Open No. 9-96746 discloses an optical circuit board as described below, which exploits advantages of optical wiring. The disclosed optical circuit board has an optical wiring section and an electric wiring section separated from each other. Light that is transmitted through the optical waveguide arranged on the substrate is modulated by driving an optical switch or an optical modulator also arranged on the substrate by means of a voltage signal applied to it from an electronic device. In this way, an electric signal is converted into an optical signal and transmitted. Then, the optical signal is received by a light-receiving device arranged on the substrate or on some other substrate and converted back into an electric signal, which electric signal is then conveyed to some other electronic device or some other part of the same electronic device. While optical wiring is provided as supplementary means for avoiding problems of electric wiring in the optical circuit board of the above identified patent document, the area that can be used for electric/optical signal conversion or optical/electric signal conversion is limited because a linear transmission path (linear polymer waveguide) is used for the optical wiring.

Japanese Patent Application Deposited-Open No. 2000-199827 proposes the use of a mirror that is inclined by 45° relative to the light path of an optical waveguide in order to efficiently couple rays of light entering or exiting perpendicularly relative to the light path of the optical waveguide. However, the transmission path is again linear because the 45°-inclined mirror is used in order to couple an incident light beam to the optical waveguide and also a light beam transmitted through the optical waveguide to a light-receiving device. Then, the positions that can be used for arranging the light-emitting device and the light-receiving device are limited to by turn limit freedom of design particularly when a plurality of transmission paths have to be arranged.

SUMMARY OF THE INVENTION

In view of the above identified problem that freedom of design is limited because the transmission path of an optical signal is linear (an optical waveguide that allows transmission of light mainly in a single direction), it is therefore an object of the present invention to provide a planar optical waveguide and a method of manufacturing the same.

Another object of the present invention is to provide an optical waveguide having an optical path changing section suitably adapted to converge and scatter light and a method of manufacturing the same.

According to the invention, there is provided a method of manufacturing a planar optical waveguide comprising: a first step of preparing a member having a structure formed on a substrate, the structure comprising a thermoplastic material; a second step of deforming the structure by heat treatment; and a third step of forming an optical waveguide section on the structure and the substrate.

The structure may be made to have a curved surface in the second step so as to make it operate as an optical path changing section.

The above described method of manufacturing a planar optical waveguide according to the invention may further comprise a fourth step of forming a reflection film on a surface of the structure deformed in the second step.

The third step may include a step of forming a core layer on the substrate and the structure and then forming a clad layer on the core layer.

At least either a light-emitting device or a light-receiving device may be mounted on the planar optical waveguide.

The structure may comprise a material selected from resists, photosensitive resins, photo-curing resins or electron beam curing resins.

The structure may have a column-shaped profile and may be deformed to show a hemispherical profile in the second step.

The planar optical waveguide and a printed circuit board carrying thereon an electronic device may be bonded to each by way of at least either a light-emitting device or a light-receiving device.

According to the invention, there is also provided a planar optical waveguide comprising: a substrate; an optical path changing section arranged on the substrate; and an optical waveguide section formed on the substrate and the optical path changing section; the optical path changing section comprising a thermoplastic resin material.

According to the invention, there is further provided a method of manufacturing a planar optical waveguide device including at least a sheet-shaped core layer and a light path converting microstructure arranged near the spot for arranging a light-emitting device or a light-receiving device, the method comprising: a first step of forming a thermoplastic first microstructure at a predetermined position on a substrate; a second step of fusing and re-solidifying the first microstructure so as to deform it and turn it into a second microstructure by heat treatment; and a third step of covering the entire substrate including the second microstructure with a core layer.

A method according to the invention and comprising the above described basic steps may be carried out in various specific modes as described below.

The planar optical waveguide device may have a multi-layer structure of a sheet-shaped core layer and first and second clad layers sandwiching the core layer and the first microstructure may be formed in the first step at a predetermined position on the first clad layer, which is the substrate, whereas the entire substrate including the second microstructure may be covered by the core layer and the second clad layer in the third step.

Furthermore, the above described method may additionally comprise a fourth step of forming a reflection film on the surface of the second microstructure. Then, the reflection film is typically formed by evaporation of a metal in the fourth step.

The above described method may further comprise a fifth step of mounting at least a light-emitting device or a light-receiving device on or in the core layer or on or in the second clad layer. Typically, an optical device mounting guide is formed by photolithography or etching and the optical device is mounted in the guide in the fifth step.

A plurality of first microstructures may be arranged at predetermined respective positions on the substrate in the first step and the plurality of microstructures may be simultaneously deformed and turned to second microstructures by heat treatment in the second step. More specifically, a plurality of microstructures uniformly showing a first profile may be arranged at predetermined respective positions on the substrate in the first step and the plurality of microstructures showing the first profile may be simultaneously deformed and turned to second microstructures uniformly showing a second profile in the second step. This mode of carrying out the present invention can emphatically realize the characteristic advantages of a manufacturing method according to the invention.

Typically, the first microstructure is formed by using at least a thermoplastic resin material selected from resists, photosensitive resins, photo-curing resins, or electron beam curing resins.

Typically, the first microstructure formed in the first step has a column-shaped profile such as a cylindrical profile and the second microstructure has a substantially hemispherical profile. Then, the profile and the radius of curvature of the microstructure of a thermoplastic material deformed by heat treatment may be appropriately controlled by treating the substrate surface to make it water-repellent. The surface energy of the substrate is reduced by such a water-repelling treatment and the thermoplastic material is repelled more strongly. As an example, a water-repellent surface can be formed by treating the substrate surface with a silane coupling agent having a functional group containing a fluorine atom.

The substrate may be made of glass and the core layer and the second clad layer may be made of an organic polymer or resin.

A method of manufacturing an opto-electronic circuit board according to the invention is proposed to dissolve the above identified problems. With the method of manufacturing an opto-electronic circuit board according to the invention, a planar optical waveguide device manufactured by the method of manufacturing a planar optical waveguide device according to the invention and a printed circuit board carrying an electronic element such as LSI are bonded to each other so that all or part of the electric signal output from the electronic element on the printed circuit board is converted into an optical signal by way of a light-emitting device, planarly transmitted through the core layer as it is scattered by the light path converting microstructure and converted back into an electric signal by way of an appropriate light-receiving device as it is scattered by the light path converting microstructure near the light-receiving device and the electric signal obtained by the conversion is electrically coupled to the electronic element on the printed circuit board. The method of manufacturing an opto-electronic circuit board may comprise a step of mounting a light-emitting device on the electric signal output terminal of the electronic element and mounting a light-receiving device on the electric signal input terminal of the electronic element and a step of bonding the light-emitting device and the light-receiving device mounted on the electronic element to the mounting guides of the planar optical waveguide device when bonding the planar optical waveguide device and the printed circuit board. Alternatively, the method of manufacturing an opto-electronic circuit board may comprise a step of mounting a light-emitting device and a light-receiving device on corresponding mounting guides of the planar optical waveguide device and a step of bonding the electrodes of the light-emitting device and the light-receiving device mounted on the planar optical waveguide device respectively to the output terminal and the input terminal of the electronic element mounted on the printed circuit board when bonding the planar optical waveguide device and the printed circuit board.

With the above described manufacturing method, in the step of arranging a plurality of microstructures uniformly showing a first profile at desired positions on the first clad layer, a pattern of circular cylinders can be formed easily at a time by using a photoresist (e. g., AZ9260) as a thermoplastic material of the microstructures and a photo-mask showing a pattern of circular openings (e. g., having a radius of 50 $\mu$m) and exposing the pattern to light irradiation perpendicularly from right above.

It was found by experiments that a microstructure showing a cylindrical profile can be deformed and turned to a microstructure showing a hemispherical profile by subjecting the former to a predetermined heat treatment in the step of deforming a first microstructure and turning it to a second microstructure. It was also found that a plurality of microstructures showing a certain profile can be deformed simultaneously and uniformly. For example, microstructures showing a cylindrical profile can be uniformly and simultaneously turned to microstructures showing a hemispherical profile when they are heat-treated at 160° C. for 30 minutes in an oven containing a nitrogen atmosphere. What is remarkable about the heat treatment is that, even if the microstructures showing a cylindrical pattern are not highly accurately formed in the first step, they can simultaneously be deformed and turned to microstructures uniformly showing a hemispherical profile in the second step. In other words, light path converting microstructures can be formed at low cost. The hemispherical profile of the microstructures is indispensable and ideal for an opto-electronic circuit board having a planar optical waveguide to scatter light or converge light. Thus, a method of manufacturing an opto-electronic circuit board according to the invention is a very effective method. A thermoplastic material (e.g., photosensitive resins, photo-curing resins such as a UV-curing resin, electron beam-curing resins or metals having a relatively low melting point) other than resists provides similar advantages.

The above described step of forming a reflection film on the surface of the second microstructure is used to raise the surface reflectivity of the microstructure for enhancing its light scattering effect. When a number of microstructures are used, a reflection film is formed on all of them at a time by for example evaporation of a metal. The use of a metal layer or a dielectric layer (multilayer film mirror) showing a reflectivity appropriate to the wavelength of light to be transmitted is effective. It may not be necessary to form a reflection film on the microstructure when the refractive index of the microstructure is smaller than that of the core layer. Alternatively, a technique of making the microstructure showing a coarse surface may be used in order to enhance its light scattering effect.

The above described step of covering the entire surface of the substrate including the microstructure with a core layer (or a core layer and a second clad layer) is used to bury the microstructure and make the substrate show a flat surface.

An application technique is used at least for the core layer because it can easily produce a flat surface.

In the above described step of mounting a light-emitting device or a light-receiving device on or in the core layer or on or in the second clad layer, a guide is formed so as to put the light-emitting device or the light-receiving device into engagement with ease and accurately align the light-emitting device or the light-receiving device with the light path converting microstructure.

As described above, a method of manufacturing a planar optical waveguide device according to the invention is characterized in that it can produce one or more than one light path converting microstructures that operate for scattering or converging light with any desired profile at low cost.

A planar optical waveguide device according to the invention is characterized in that it can be deposited on a conventional printed circuit board or vice versa to form an opto-electronic circuit board. A planar optical waveguide device can be deposited on a printed circuit board either by mounting a light-emitting device or a light-receiving device on the planar optical waveguide device by way of a mounting guide and subsequently electrically connecting the planar optical waveguide device to the printed circuit board or by mounting a light-emitting device or a light-receiving device on the printed circuit board and subsequently electrically connecting the planar optical waveguide device and the printed circuit board by way of a mounting guide.

BRIEF DESCRIPTION OF THE DRAWINGS

FIGS. 1A, 1B, 1C, 1D, 1E, 1F and 1G are schematic cross sectional views of an embodiment of the present invention.

FIGS. 2A, 2B, 2C, 2D, 2E, 2F, 2G and 2H are schematic cross sectional views of a first embodiment of the manufacture of a planar optical waveguide device according to the present invention, using a resist as thermoplastic material for the microstructures thereof.

FIGS. 4A, 4B, 4C, 4D, 4E, 4F, 4G, 4H, 4I, 4J and 4K are schematic cross sectional views of a second embodiment of the method of manufacturing an opto-electronic circuit board realized by using a planar optical waveguide according to the invention.

FIGS. 5A, 5B, 5C, 5D, 5E, 5F, 5G, 5H, 5I, 5J, 5K and 5L are schematic cross sectional views of a third embodiment of the method of manufacturing an opto-electronic circuit board realized by using a planar optical waveguide according to the invention.

FIGS. 6A, 6B, 6C, 6D, 6E, 6F, 6G and 6H are schematic cross sectional views of a fourth embodiment of the method of manufacturing a planar optical waveguide device according to the invention.

FIGS. 8A, 8B, 8C, 8D, 8E, 8F, 8G, 8H, 8I, 8J and 8K are schematic cross sectional views of a fifth embodiment of the method of manufacturing an opto-electronic circuit board realized by using a planar optical waveguide according to the invention.

FIGS. 9A, 9B, 9C, 9D, 9E, 9F, 9G, 9H, 9I, 9J, 9K and 9L are schematic cross sectional views of a sixth embodiment of the method of manufacturing an opto-electronic circuit board realized by using a planar optical waveguide according to the invention.

DESCRIPTION OF THE PREFERRED EMBODIMENTS

Figure 3:
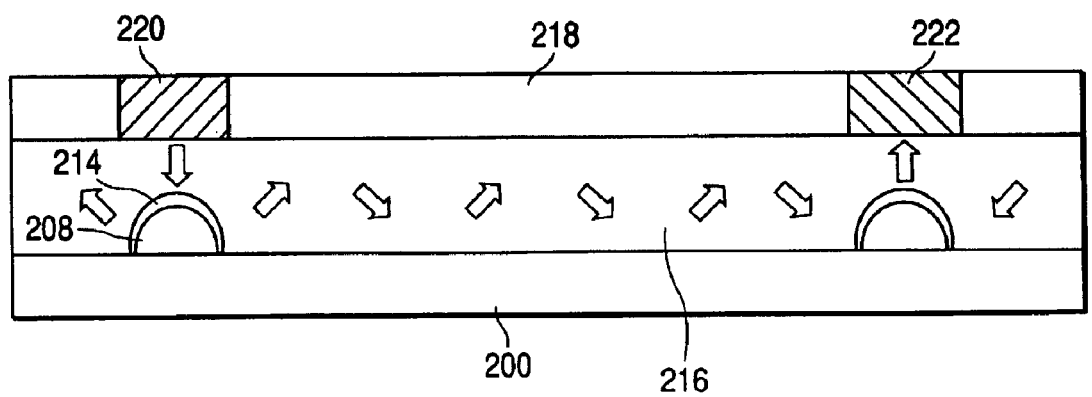
FIG. 3 is a schematic cross sectional view of a planar optical waveguide device manufactured by the first embodiment of the invention, illustrating the operation of the element.

Now, an embodiment of the present invention will be described by referring to FIGS. 1A through 1G.

With this embodiment, firstly a member having structures 102 formed on a substrate 100 as shown in FIG. 1A is prepared (Step 1). The structures comprise a thermoplastic material. Then, the structures 102 are deformed by heat treatment (Step 2) as shown in FIG. 1B. More specifically, the structures 102 are deformed as they are fused and re-solidified. As the result of deformation, the structures 102 are turned to structures 104 having a profile (e.g., of a curved surface) adapted to operate as optical path changing sections. Subsequently, an optical waveguide section is formed on the substrate 100 and the structures 104 to produce a planar optical waveguide having optical path changing sections (not shown). If necessary, the structures are further processed to form a reflection film on each of the surfaces thereof. More specifically, a resist mask 106 is formed on the substrate 100 as shown in FIG. 1C and a reflection film material 108 is deposited on the resist mask 106 and the structures 104 (FIG. 1D). Then, the resist mask 106 is removed to produce a reflection film 110 on the respective structures 104 (FIG. 1E).

The above described optical waveguide section may be formed by an alternative process as described below.

A core layer 112 and a second clad layer 114 are formed by this alternative process as shown in FIG. 1F. If the material of the substrate 100 is so selected as to make the substrate 100 operate as a clad layer relative to the core layer 112, an optical waveguide having a construction of clad layer/core layer/clad layer can be obtained.

Still alternatively, a planar optical waveguide device can be formed by mounting a light-emitting device 116 and a light-receiving device 118 in the above optical waveguide as shown in FIG. 1G. Then, it is possible to provide an information processing apparatus realized by using a circuit board including such a planar optical waveguide device (opto-electronic fused substrate).

According to the invention, optical path changing sections 104 are formed by deforming structures 102 by heat treatment. Therefore, when a number of structures are arranged on a substrate, they can be simultaneously deformed.

A glass substrate may typically be used for the substrate 100. However, it should be noted that a material having a refractive index lower than that of the material of the optical waveguide section is preferably used for the substrate 100. There are no particular limitations for the selection of the material of the structures 102 so long as the material shows thermal plasticity. Examples of such a material that can be used for the structures 102 include positive resists, negative resists, photosensitive polysilane resins, relatively low melting point metals such as Sn—Ag—Cu solder and metal paste such as silver paste.

Desired optical path changing sections can be produced by using structures 102 having a profile of a cylinder or a polygonal prism such as a quadrangular prism. Hemicylindrical or hemispherical optical path changing sections can be produced when the structures are made to show a rectangular or square plan view.

The extent of deformation by heat of the structures can be controlled by partially exposing the structures 102 to irradiation of light or laser beams between the first step and the second step.

The substrate 100 and the structures 102 may be made of a same material. For example, the member of FIG. 1A can be formed by using a substrate and structures that are equally made of photosensitive polysilane resins.

Now, the present invention will be described further by referring to the accompanying drawings that illustrate specific embodiments.

(First Embodiment)

FIGS. 2A to 2H are schematic cross sectional views of a first embodiment of the method of manufacturing a planar optical waveguide device according to the present invention, using a resist as the thermoplastic material of the microstructures.

In FIGS. 2A through 2H, there are shown a first clad layer 200 operating as a substrate, a microstructure material 202, a photo-mask 204 for forming a desired shading pattern that is aligned with the arrangement of light path converting microstructures, a plurality of microstructures 206 showing a first profile, a plurality of microstructures 208 showing a second profile, a resist mask 210 formed on the first clad layer 200, a reflection film material 212 deposited on the first clad layer 200 and the microstructures 208, reflection films 214 formed on the respective microstructures 208, a core layer 216, a second clad layer 218, light-emitting devices 220 and light-receiving devices 222.

Firstly as shown in FIG. 2A, a resist (AZ9260) 202 is applied to (i.e., used to coat therewith) the surface of a glass substrate (Corning 7059) 200 that operates as a first clad layer by means of a spin coater and the applied resist 202 is selectively exposed to UV light by using a photo-mask 204 (having a plurality of round shading patterns with a radius of 50 $\mu$m).

Subsequently, as shown in FIG. 2B, microstructures 206 showing a cylindrical first profile with a radius of 50 $\mu$m and a height of 35 $\mu$m are formed by way of a developing process. Then, the work is put in the inside of an oven filled with a nitrogen atmosphere and heated to 160° C. for 30 minutes in order to fuse and re-solidify the microstructures 206 of resist by heat treatment. As a result, the microstructures 206 showing the above described first profile are turned to microstructures 208 showing a hemispherical second profile with a radius of 50 $\mu$m as illustrated in FIG. 2C. The aspect ratio of the cylindrical profile may be freely selected depending on the circumstances.

Then, a photoresist is applied to the entire surface of the work by means of a spin coater and subsequently subjected to exposure and development processes in order to form a resist mask 210 so as to expose only the surfaces of the microstructures 208 showing a hemispherical second profile as shown in FIG. 2D. Thereafter, as shown in FIG. 2E, a reflection film material 212, which is Cr/Au (the thickness of Cr: 50 nm, the thickness of Au: 200 nm), is deposited on the entire surface of the work by means of an electron beam evaporation system (Cr takes the role of adhesive for firmly bonding the reflection film of Au and the surfaces of the microstructures 208). The reflection film shows a reflectivity of not lower than 90% to light having a wavelength not shorter than 600 nm. Thereafter, the substrate of FIG. 2E is immersed into a remover solution that is heated to 80° C. and subjected to an ultrasonic cleaning operation. As a result of the lift-off process, the reflection film 214 is formed only on the surfaces of the microstructures 208 having the hemispherical profile as shown in FIG. 2F.

Then, as shown in FIG. 2G, a core layer 216 is formed to a thickness of 100 $\mu$m by applying a polymeric material (polycarbonate resin, refractive index: 1.58) having a refractive index higher than that of the glass substrate 200 and curing it. Thereafter, a 40 $\mu$m thick second clad layer 218 is formed by applying another polymeric material (norbornene resin, refractive index: 1.51) having a refractive index lower than that of the core layer 216 and curing it. In the case of this embodiment, since the reflection film 214 is formed on the microstructures 208, the relationship of the values between the refractive index of the microstructures 208 and that of the core layer 216 is not particularly important.

Subsequently, a resist mask (not shown) are formed for the purpose of forming grooves in which optical devices are to be mounted right above the respective microstructures 208 having the hemispherical second profile as shown in FIG. 2H. Then, the work is put in a reactive ion etching (RIE) system in order to selectively etch the second clad layer 218 under etching conditions of RF power: 500 W, pressure: 2 Pa and $O_2$ gas flow rate: 20 sccm. As a result of the etching process, optical device mounting guides are formed. Then, a complete planar optical waveguide device is produced by mounting light-emitting devices 220 and light-receiving devices 222.

Since the microstructures 208 showing a hemispherical second profile as a result of deformation and having the respective reflection films 214 are arranged in the produced planar optical waveguide device as shown in FIG. 3, rays of light striking the hemispherical microstructures 208 from above (which are preferably caused to strike the entire surfaces of the microstructures 208) are efficiently scattered by the microstructures 208 having the respective reflection films 214 so as to propagate through the entire core layer 216 in all directions. Additionally, rays of light propagated through the core layer 216 are scattered again by the microstructures 208 showing the hemispherical second profile and having the respective reflection films 214 so as to go out from the microstructures 208 showing the hemispherical second profile and move upward. In this way, light from the light-emitting device 220 is reliably transmitted to the light-receiving device 222.

While a glass substrate, polycarbonate resin and norbornene resin are used respectively as materials of the first clad layer 200, the core layer 216 and the second clad layer 218 in the above description of the embodiment, materials that can be used for the above components are by no means limited to them. A combination of polyimide resin, acrylic resin, fluorinated polyimide resin and photosensitive polysilane resin may alternatively be used so long as the material of the core layer shows a refractive index higher than those of the materials of the first and second clad layers. Such an appropriate combination of materials can also be used for the other embodiments that will be described hereinafter.

Additionally, while a glass substrate is used as the material of the first clad layer 200, the latter may be made of some other appropriate material. For example, it may be made of a resin film having a refractive index lower than that of the material of the core layer 216. Then, the produced planar optical waveguide can be bent. Furthermore, the planar optical waveguide may comprise only a core layer. If such is the case, the core layer may be peeled off from the substrate on which it was formed and optical devices may be mounted on or in the core layer.

While the core layer 216 and the second clad layer 218 have respectively thicknesses of 100 μm and 40 μm in the above description of the embodiment, their thicknesses are by no means limited thereto. They may have appropriate thicknesses so long as they operate properly for their desired respective functions.

While the microstructures 206 showing the first profile are cylindrical and have a radius of 50 μm and a height of 35 μm in the above description of the first embodiment, their profile is by no means limited thereto. They may alternatively show a profile of a column having an elliptic or polygonal cross section and different dimensions.

While the optical device mounting guides are formed by etching in the above description of the embodiment, they may alternatively be formed by using a photosensitive resin material for the second clad layer 218 and subjecting the photosensitive resin material to exposure and development processes.

Finally, while the microstructures 206 showing the first profile are formed by way of exposure and development processes in the above description of the embodiment, they may alternatively be formed by applying a thermoplastic material and etching the applied material or by dropping a thermoplastic material to form a desired pattern of the material. In short, an appropriate technique of forming the microstructures may be selected depending on the material and the function of changing an optical path.

(Second Embodiment)

FIGS. 4A to 4K are schematic cross sectional views of a second embodiment of the method of manufacturing an opto-electronic circuit board realized by using a planar optical waveguide device according to the invention. In FIGS. 4A through 4K, there are shown a first clad layer 300, a microstructure material 302, a photo-mask 304, microstructures 306 showing a first profile, microstructures 308 showing a second profile, a resist mask 310 formed on the first clad layer 300, a refection film material 312, reflection films 314, a core layer 316, a second clad layer 318, a planar optical waveguide device 320, a resist mask 322, optical device mounting guides 324, LSI chips 326, a printed circuit board 328, light-emitting devices 330, light-receiving devices 332 and an opto-electronic circuit board 334.

Firstly as shown in FIG. 4A, a resist (AZ9260) 302 is applied to the surface of a glass substrate (Corning 7059) 300 that operates as a first clad layer by means of a spin coater and the applied resist 302 is exposed to UV light by using a photo-mask 304 (having a pattern of round shades with a radius of 50 μm). Subsequently, as shown in FIG. 4B, microstructures 306 showing a cylindrical first profile with a radius of 50 μm and a height of 35 μm are formed by way of a developing process. Then, the work is put in the inside of an oven filled with a nitrogen atmosphere and heated to 160° C. for 30 minutes in order to fuse. and re-solidify the microstructures 306 of resist by heat treatment. As a result, the microstructures 306 showing the above described first profile are turned to microstructures 308 showing a hemispherical second profile with a radius of 50 μm as shown in FIG. 4C.

Then, a photoresist is applied to the entire surface of the work by means of a spin coater and subsequently subjected to exposure and development processes in order to form a resist mask 310 so as to expose only the surfaces of the microstructures 308 showing a hemispherical second profile as shown in FIG. 4D. Thereafter, as shown in FIG. 4E, a reflection film material 312, which is Cr/Au (the thickness of Cr: 50 nm, the thickness of Au: 200 nm), is deposited on the entire surface of the work by evaporation by means of an electron beam vacuum evaporation system. The reflection film shows a reflectivity of not lower than 90% to light having a wavelength of 660 nm. Thereafter, the substrate is immersed into a remover solution that is heated to 80° C. and subjected to an ultrasonic cleaning operation. As a result, the reflection film 314 is formed only on the surfaces of the microstructures 308 having the hemispherical second profile as shown in FIG. 4F.

Then, as shown in FIG. 4G, a core layer 316 is formed to a thickness of 100 μm by applying a polymeric material (polycarbonate resin, refractive index: 1.58) having a refractive index higher than that of the glass substrate 300 and curing it. Thereafter, a 40 μm thick second clad layer 318 is formed by applying another polymeric material (norbornene resin, refractive index: 1.51) having a refractive index lower than that of the core layer 316 and curing it to obtain a planar optical waveguide device 320.

Subsequently, a resist mask 322 is formed for the purpose of forming grooves in which optical devices are to be mounted right above the respective microstructures 308 having the hemispherical second profile as shown in FIG. 4H. Then, the work is put in a reactive ion etching (RIE) system in order to etch the second clad layer 318 under etching conditions of RF power: 500 W, pressure: 2 Pa and $O_2$ gas flow rate: 20 sccm. As a result of the etching process, optical device mounting guides 324 are formed as shown in FIG. 4I. The above operation is substantially the same as the corresponding operation of forming the first embodiment.

Then, a printed circuit board 328 is prepared as shown in FIG. 4J. The printed circuit board 328 has LSI chips 326 mounted thereon and provided on the top surface of the package with electric signal input/output terminals. Subsequently, light-emitting devices 330 and light-receiving devices 332 are mounted on the LSI chips 326 arranged on the printed circuit board 328. Then, the light-emitting devices 330 and the light-receiving device 332 on the LSI chips 326 arranged on the printed circuit board 328 are fitted into the respective optical device mounting guides 324. Then, the printed circuit board 328 is bonded to the planar optical waveguide device 320 by way of an optical adhesive to obtain an opto-electronic circuit board 334 as shown in FIG. 4K.

An opto-electronic circuit board 334 prepared in this way effectively suppresses EMI if compared with an instance where logic signals are transmitted from the LSI chips 326 as electric signals because logic signals are transmitted as optical signals that is basically free from electromagnetic induction. Additionally, an opto-electronic circuit board 334 prepared in this way is advantageous in terms of cost because it can be prepared without changing the design of the printed circuit board 328. Furthermore, any undesired increase of the surface area of the printed circuit board 328 that may be required for mounting components can be suppressed because light-emitting devices and light-receiving devices for converting electric signals into optical signals do not need to be directly arranged on the printed circuit board 328 when LSI chips 326 having electric signal input/output terminals arranged on the top surfaces of the packages are used.

The alternative arrangements described above for the first embodiment can also be used for this embodiment.

(Third Embodiment)

FIGS. 5A to 5L are schematic cross sectional views of a third embodiment of the method of manufacturing an opto-electronic circuit board realized by using a planar optical waveguide device according to the invention. In FIGS. 5A through 5L, there are shown a first clad layer 400, a microstructure material 402, a photo-mask 404, microstructures 406 showing a first profile, microstructures 408 showing a second profile, a resist mask 410, a reflection film material 412, reflection films 414, a core layer 416, a second clad layer 418, a planar optical waveguide device 420, a resist mask 422, optical device mounting guides 424, light-emitting devices 426, light-receiving devices 428, LSI chips 430, a printed circuit board 432 and an opto-electronic circuit board 434.

Firstly as shown in FIG. 5A, a resist (AZ9260) 402 is applied to the surface of a glass substrate (Corning 7059) 400 that operates as a first clad layer by means of a spin coater and the applied resist 402 is exposed to UV light by using a photo-mask 404 (having a pattern of round shades with a radius of 50 $\mu$m). Subsequently, as shown in FIG. 5B, microstructures 406 showing a cylindrical first profile with a radius of 50 $\mu$m and a height of 35 $\mu$m are formed by way of a developing process. Then, the work is put in the inside of an oven filled with a nitrogen atmosphere and heated to 160° C. for 30 minutes in order to fuse and re-solidify the microstructures of resist by heat treatment. As a result, the microstructures 406 showing the above described first profile are turned to microstructures 408 showing a hemispherical second profile with a radius of 50 $\mu$m as shown in FIG. 5C.

Then, a photoresist is applied to the entire surface of the work by means of a spin coater and subsequently subjected to exposure and development processes in order to form a resist mask 410 so as to expose only the surfaces of the microstructures 408 showing a hemispherical second profile as shown in FIG. 5D. Thereafter, as shown in FIG. 5E, a reflection film material 412, which is Cr/Au (the thickness of Cr: 50 nm, the thickness of Au: 200 nm), is deposited on the entire surface of the work by evaporation by means of an electron beam vacuum evaporation system. The reflection film shows a reflectivity of not lower than 90% to light having a wavelength not shorter than 600 nm. Thereafter, the substrate is immersed into a remover solution that is heated to 80° C. and subjected to an ultrasonic cleaning operation. As a result; the reflection film 414 is formed only on the surfaces of the microstructures 408 having the hemispherical second profile as shown in FIG. 5F.

Then, as shown in FIG. 5G, a core layer 416 is formed to a thickness of 100 $\mu$m by applying a polymeric material (polycarbonate resin, refractive index: 1.58) having a refractive index higher than that of the glass substrate 400 and curing it. Thereafter, a 40 $\mu$m thick second clad layer 418 is formed by applying another polymeric material (norbornene resin, refractive index: 1.51) having a refractive index lower than that of the core layer 416 and curing it to obtain a planar optical waveguide device 420.

Subsequently, a resist mask 422 is formed for the purpose of forming grooves in which optical devices are to be mounted right above the respective microstructures 408 having the hemispherical second profile as shown in FIG. 5H. Then, the work is put in a reactive ion etching (RIE) system in order to etch the second clad layer 418 under etching conditions of RF power: 500 W, pressure: 2 Pa and $O_2$ gas flow rate: 20 sccm. As a result of the etching process, optical device mounting guides 424 are formed as shown in FIG. 5I. Then, light-emitting devices 426 and light-receiving devices 428 are mounted in the optical device mounting guides 424 by way of an optical adhesive as shown in FIG. 5J. The above operation is substantially the same as the corresponding operation of forming the first embodiment.

Then, a printed circuit board 432 is prepared. The printed circuit board 432 has LSI chips 430 mounted thereon and provided on the top surface of the package with electric signal input/output terminals as shown in FIG. 5K. Subsequently, light-emitting devices 426 and light-receiving devices 428 are mounted on the LSI chips 430 arranged on the printed circuit board 432. Then, the planar optical waveguide device 420 and the printed circuit board 432 are bonded to each other so as to connect the electrode pads of the light-emitting devices 426 and the light-receiving devices 428 to the corresponding input/output terminals of the LSI chips 430 and obtain an opto-electronic circuit board 434 as shown in FIG. 5L.

An opto-electronic circuit board 434 prepared in this way effectively suppresses EMI if compared with an instance where logic signals are transmitted from the LSI chips 430 as electric signals because logic signals are transmitted as optical signals that is basically free from electromagnetic induction. The opto-electronic circuit board 434 provides additional advantages similar to those of the second embodiment.

The alternative arrangements described above for the first embodiment can also be used for this embodiment.

(Fourth Embodiment)

FIGS. 6A to 6H are schematic cross sectional views of a fourth embodiment of the method of manufacturing a planar optical waveguide device according to the present invention, using a UV-curing resin as a microstructure material. In FIGS. 6A through 6H, there are shown a first clad layer 500, a microstructure material 502, a photo-mask 504, microstructures 506 showing a first profile, microstructures 508 showing a second profile, a resist mask 510, a reflection film material 512, reflection films 514, a core layer 516, a second clad layer 518, a light-emitting devices 520 and light-receiving devices 522.

Firstly as shown in FIG. 6A, a UV-curing resin 502 is applied to the surface of a glass substrate (Corning 7059) 500 that operates as a first clad layer by means of a spin coater and the applied resist 502 is exposed to light by using a photo-mask 504 (having a pattern of round UV transmitting sections with a radius of 30 $\mu$m). Subsequently, as shown in FIG. 6B, microstructures 506 showing a cylindrical first profile with a radius of 30 $\mu$m and a height of 50 $\mu$m are formed by removing parts of the UV-curing resin that are not exposed to UV. Then, the work is put in the inside of an oven filled with a nitrogen atmosphere and heated to 200° C. for 60 minutes in order to fuse and re-solidify the microstructures 506 having the first profile and made of a UV-curing resin by heat treatment. As a result, the microstructures 506 showing the above described first profile are turned to microstructures 508 having a radius of 50 $\mu$m and showing a hemispherical second profile as illustrated in FIG. 6C.

Then, a photoresist is applied to the entire surface of the work by means of a spin coater and subsequently subjected to exposure and development processes in order to form a resist mask 510 so as to expose only the surfaces of the microstructures 508 showing a hemispherical second profile as shown in FIG. 6D. Thereafter, as shown in FIG. 6E, a reflection film material 512, which is Cr/Au (the thickness of Cr: 50 nm, the thickness of Au: 200 nm), is deposited on the entire surface of the work by evaporation by means of an electron beam vacuum evaporation system. The reflection film shows a reflectivity of not lower than 90% to light having a wavelength not shorter than 600 nm. Thereafter, the substrate is immersed into a remover solution that is heated to 80° C. and subjected to an ultrasonic cleaning operation.

As a result, the reflection film 514 is formed only on the surfaces of the microstructures 508 having the hemispherical second profile as shown in FIG. 6F.

Then, as shown in FIG. 6G, a core layer 516 is formed to a thickness of 100 μm by applying a polymeric material (polycarbonate resin, refractive index: 1.58) having a refractive index higher than that of the glass substrate 500 and curing it. Thereafter, a 40 μm thick second clad layer 518 is formed by applying another polymeric material (norbornene resin, refractive index: 1.51) having a refractive index lower than that of the core layer 516 and curing it.

Subsequently, a resist mask (not shown) is formed for the purpose of forming grooves in which optical devices are to be mounted right above the respective microstructures 508 having the hemispherical second profile as shown in FIG. 6H. Then, the work is put in a reactive ion etching (RIE) system in order to etch the second clad layer 518 under etching conditions of RF power: 500 W, pressure: 2 Pa and $O_2$ gas flow rate: 20 sccm. As a result of the etching process, optical device mounting guides (not shown) are formed. Then, a complete planar optical waveguide device is produced by mounting light-emitting devices 520 and light-receiving devices 522 on the optical device mounting guides.

Figure 7:
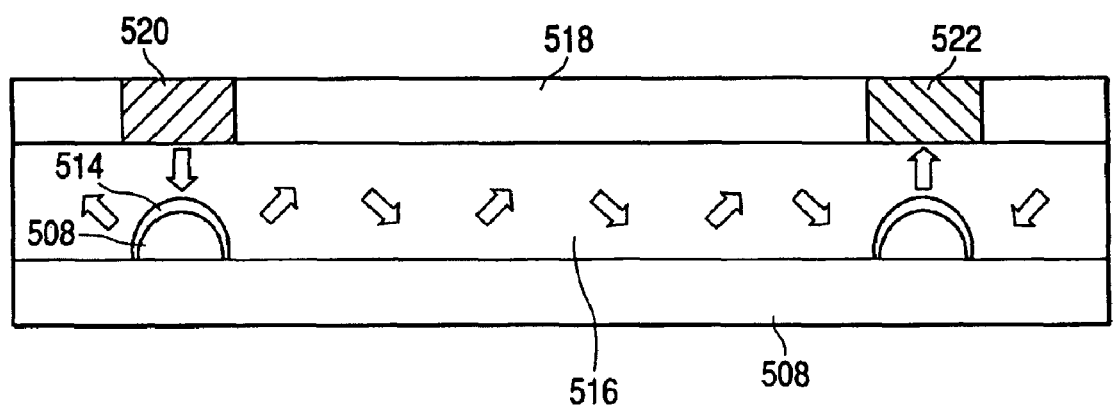
FIG. 7 is a schematic cross sectional view of a planar optical waveguide device manufactured by the fourth embodiment of the invention, illustrating the operation of the element.

Since the microstructures 508 showing a hemispherical second profile as a result of deformation and having the respective reflection films 514 are arranged in the produced planar optical waveguide device as shown in FIG. 7, rays of light striking the hemispherical microstructures 508 from the light-emitting device 520 that is located above the microstructures are efficiently scattered so as to propagate through the entire planar optical waveguide. Additionally, rays of light propagated through the core layer 516 are scattered again by the microstructures 508 showing the hemispherical second profile so as to go out from the microstructures 508 showing the hemispherical profile and become transmitted to the light-receiving device 522 that is located above the microstructures 508 having the hemispherical second profile.

While the microstructures 506 showing the first profile are cylindrical and have a radius of 30 μm and a height of 50 μm in the above description of the fourth embodiment, their profile is by no means limited thereto. They may alternatively show a profile of a column having an elliptic or polygonal cross section and different dimensions. Additionally, the alternative arrangements described above for the first embodiment can also be used for this embodiment.

(Fifth Embodiment)

FIGS. 8A to 8K are schematic cross sectional views of a fifth embodiment of the method of manufacturing an opto-electronic circuit board realized by using a planar optical waveguide device according to the invention. In FIGS. 8A through 8K, there are shown a first clad layer 600, a microstructure material 602, a photo-mask 604, microstructures 606 showing a first profile, microstructures 608 showing a second profile, a resist mask 610, a reflection film material 612, reflection films 614, a core layer 616, a second clad layer 618, a planar optical waveguide device 620, a resist mask 622, optical device mounting guides 624, LSI chips 626, a printed circuit board 628, light-emitting devices 630, light-receiving devices 632 and an opto-electronic circuit board 634.

Firstly as shown in FIG. 8A, a UV-curing resin 602 is applied to the surface of a glass substrate (Corning 7059) 600 that operates as a first clad layer by means of a spin coater and the applied resist 602 is exposed to UV light by using a photo-mask 604 (having a pattern of round UV transmitting sections with a radius of 30 μm). Subsequently, as shown in FIG. 8B, microstructures 606 showing a cylindrical first profile with a radius of 30 μm and a height of 35 μm are formed by removing parts of the UV-curing resin that are not exposed to UV. Then, the work is put in the inside of an oven filled with a nitrogen atmosphere and heated to 200° C. for 60 minutes in order to fuse and re-solidify the microstructures 606 having the first profile and made of UV-curing resin by heat treatment. As a result, the microstructures 606 showing the above described first profile are turned to microstructures 608 showing a hemispherical second profile with a radius of 50 μm as illustrated in FIG. 8C.

Then, a photoresist is applied to the entire surface of the work by means of a spin coater and subsequently subjected to exposure and development processes in order to form a resist mask 610 so as to expose only the surfaces of the microstructures 608 showing a hemispherical second profile as shown in FIG. 8D. Thereafter, as shown in FIG. 8E, a reflection film material 612, which is Cr/Au (the thickness of Cr: 50 nm, the thickness of Au: 200 nm), is deposited on the entire surface of the work by evaporation by means of an electron beam vacuum evaporation system. The reflection film shows a reflectivity of not lower than 90% to light having a wavelength not shorter than 600 nm. Thereafter, the substrate is immersed into a remover solution that is heated to 80° C. and subjected to an ultrasonic cleaning operation. As a result, the reflection film 614 is formed only on the surfaces of the microstructures 608 having the hemispherical second profile as shown in FIG. 8F.

Then, as shown in FIG. 8G, a core layer 616 is formed to a thickness of 100 μm by applying a polymeric material (polycarbonate resin, refractive index: 1.58) having a refractive index higher than that of the glass substrate 600 and curing it. Thereafter, a 40 μm thick second clad layer 618 is formed by applying another polymeric material (norbornene resin, refractive index: 1.51) having a refractive index lower than that of the core layer 616 and curing it. As a result, a planar optical waveguide device 620 is obtained.

Subsequently, a resist mask 622 is formed for the purpose of forming grooves in which optical devices are to be mounted right above the respective microstructures 608 having the hemispherical second profile as shown in FIG. 8H. Then, the work is put in a reactive ion etching (RIE) system in order to etch the second clad layer 618 under etching conditions of RF power: 500 W, pressure: 2 Pa and $O_2$ gas flow rate: 20 sccm. As a result of the etching process, optical device mounting guides 624 are formed as shown in FIG. 8I.

Then, a printed circuit board 628 is prepared. The printed circuit board 628 has LSI chips 626 mounted thereon and provided on the top surface of the package with electric signal input/output terminals as shown in FIG. 8J. Subsequently, light-emitting devices 630 and light-receiving devices 632 are mounted on the LSI chips 626 arranged on the printed circuit board 628. Then, light-emitting devices 630 and a light-receiving device 632 which are formed on the LSI chips 626 that are mounted on the printed circuit board 628 are fitted into the respective optical device mounting guides 624. Then, the printed circuit board 628 is bonded to the planar optical waveguide device 620 by way of an optical adhesive to produce an opto-electronic circuit board 634 as shown in FIG. 8K.

An opto-electronic circuit board 634 prepared in this way effectively suppresses EMI if compared with an instance where logic signals are transmitted from the LSI chips 626 as electric signals because logic signals are transmitted as optical signals that is basically free from electromagnetic induction. The opto-electronic circuit board 634 provides additional advantages similar to those of the second embodiment.

While the microstructures 606 showing the first profile are cylindrical and has a radius of 30 μm and a height of 50 μm in the above description of the fifth embodiment, their profile is by no means limited thereto. They may alternatively show a profile of a column having an elliptic or polygonal cross section and different dimensions.

The alternative arrangements described above for the first embodiment can also be used for this embodiment.

(Sixth Embodiment)

FIGS. 9A to 9L are schematic cross sectional views of a sixth embodiment of the method of manufacturing an opto-electronic circuit board realized by using a planar optical waveguide device of the fourth embodiment of the invention. In FIGS. 9A through 9L, there are shown a first clad layer 700, a microstructure material 702, a photo-mask 704, microstructures 706 showing a first profile, microstructures 708 showing a second profile, a resist mask 710, a reflection film material 712, reflection films 714, a core layer 716, a second clad layer 718, a planar optical waveguide device 720, a resist mask 722, optical device mounting guides 724, light-emitting devices 726, light-receiving devices 728, LSI chips 730, a printed circuit board 732, and an opto-electronic circuit board 734.

The steps to the one of mounting light-emitting devices 726 or light-receiving devices 728 in the respective optical device mounting guides 724 as shown in FIG. 9J are the same as those described above for the fourth embodiment. Then, a printed circuit board 732 is formed. The printed circuit board 732 has LSI chips 730 mounted thereon and provided on the top surface of the package with electric signal input/output terminals as shown in FIG. 9K. Then, the planar optical waveguide device 720 and the printed circuit board 732 are bonded to each other so as to connect the electrode pads of the light-emitting devices 726 or the light-receiving devices 728 to the corresponding input/output terminals of the LSI chips 730 and obtain an opto-electronic circuit board 734 as shown in FIG. 9L.

An opto-electronic circuit board 734 prepared in this way effectively suppresses EMI if compared with an instance where logic signals are transmitted from the LSI chips 730 as electric signals because logic signals are transmitted as optical signals that is basically free from electromagnetic induction. The opto-electronic circuit board 734 provides additional advantages similar to those of the second embodiment.

While the microstructures 706 showing the first profile are cylindrical and have a radius of 30 μm and a height of 50 μm in the above description of the sixth embodiment, their profile is by no means limited thereto. They may alternatively show a profile of a column having an elliptic or polygonal cross section and different dimensions. Additionally, the alternative arrangements described above for the first embodiment can also be used for this embodiment.

(Seventh Embodiment)

Figure 10A:
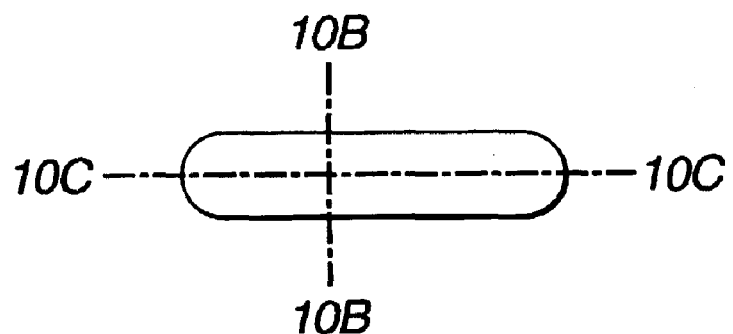
FIGS. 10A, 10B and 10C are schematic illustrations of a microstructure formed by a seventh embodiment of the manufacture of a planar optical waveguide device according to the invention, illustrating the profile after deformation by heat.
Figure 10B:
Figure 10C:

Microstructures having a first profile (not shown) are formed by subjecting a resist to exposure and development processes as in the first embodiment. However, instead of the microstructures showing a cylindrical profile and having a radius of 50 μm and a height of 35 μm, the microstructures of this embodiment show a box-shaped first profile with a width of 100 μm, a length of 1,500 μm and a height of 35 μm (not shown). The microstructures having the first profile are heated to 150° C. for 5 minutes on a hot plate in order to fuse and re-solidify the microstructures by heat treatment. As a result, the microstructures showing the above described first profile are deformed and turned to microstructures showing a hemicylindrical profile (obtained by cutting a circular cylinder along the axis thereof) with a semicircular cross section whose radius is 50 μm as shown in FIGS. 10A through 10C. Note that FIG. 10A is a plan view of a microstructure after the thermal deformation and FIGS. 10B and 10C are cross sectional views taken along lines 10B–10B and 10C–10C respectively.

It will be appreciated that microstructures having the first profile as described above by referring to the first through third embodiments can also be deformed and turned to microstructures having the hemispherical second profile by heating them to 150° C. for 5 minutes on a hot plate in place of heat-treating them in an oven. The second profile of the microstructures can be modified appropriately by controlling the heat treatment temperature and/or the heat treatment time.

Figure 11A:
FIGS. 11A, 11B and 11C are schematic illustrations of microstructures obtained after heat treatment and showing different profiles produced by differences of heat treatment temperature and heat treatment time.
Figure 11B:
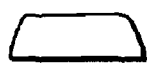
Figure 11C:

In an experiment, microstructures having a first profile as shown in FIG. 11A, which are similar to those illustrated for the first embodiment, were heated to 135° C. for 5 minutes on a hot plate in order to fuse and re-solidify. As a result, the microstructures showing the above described first profile are deformed and turned to microstructures showing a hemispherical second profile as illustrated in FIG. 11B. Additionally, microstructures having a first profile as shown in FIG. 11A were heated to 150° C. for 7 minutes on a hot plate in order to fuse and re-solidify. As a result, the microstructures showing the above described first profile are deformed and turned to microstructures showing a hemispherical second profile as illustrated in FIG. 11C. FIG. 11A is a lateral view of a semi-sphere having a radius of 50 μm. FIG. 11B is a lateral view of a slightly deformed half-sphere having a circular bottom with a radius of 50 μm and a height of 40 μm. FIG. 11C is a lateral view of a slightly deformed half-sphere having a circular bottom with a radius of 50 μm and a height of 65 μm.

As described above in detail, the present invention provides a planar optical waveguide having optical path changing sections and a method of manufacturing such a planar optical waveguide.

What is claimed is:

1. A method of manufacturing a planar optical waveguide comprising:
    a first step of preparing a member having a structure formed on a substrate, said structure comprising a thermoplastic material;
    a second step of deforming the structure by heat treatment; and
    a third step of forming an optical waveguide section on the structure and on the substrate.

2. A method according to claim 1, wherein said structure is made to have a curved surface in said second step so as to make it operate as an optical path changing section.

3. A method according to claim 1 further comprising:
    a fourth step of forming a reflection film on a surface of the structure deformed in said second step.

4. A method according to claim 1, wherein said third step includes a step of forming a core layer on the substrate and the structure and then forming a clad layer on the core layer.

5. A method according to claim 1 further comprising:
    a fifth step of mounting at least either a light-emitting device or a light-receiving device on said planar optical waveguide.

6. A method according to claim 1, wherein said structure comprises a material selected from resists, photosensitive resins, photo-curing resins or electron beam curing resins.

7. A method according to claim 1, wherein said structure has a column-shaped profile and is deformed to show a hemispherical profile in said second step.

8. A method of manufacturing an opto-electronic circuit board comprising:

a step of bonding a planar optical waveguide manufactured by a method according to claim 1 and a printed circuit board carrying thereon an electronic device to each other by way of at least either a light-emitting device or a light-receiving device.

* * * * *

UNITED STATES PATENT AND TRADEMARK OFFICE
CERTIFICATE OF CORRECTION

PATENT NO. : 6,944,385 B2
DATED : September 13, 2005
INVENTOR(S) : Tatsuro Uchida It is certified that error appears in the above-identified patent and that said Letters Patent is hereby corrected as shown below:

Column 1,
Line 56, "limited to" should read -- limited, to --.

Column 8,
Line 21, "are" should read -- is --.

Column 11,
Line 42, "result;" should read -- result, --.

Column 12,
Line 18, "is" should read -- are --; and
Line 34, "a" should be deleted.

Column 13,
Line 36, "become" should read -- be --.

Column 15,
Line 2, "is" should read -- are --;
Line 7, "has" should read -- have --; and
Line 47, "is" should read -- are --.

Signed and Sealed this

Twenty-first Day of February, 2006

JON W. DUDAS
*Director of the United States Patent and Trademark Office*